United States Patent [19]
Silver

[11] Patent Number: 5,717,785
[45] Date of Patent: Feb. 10, 1998

[54] METHOD AND APPARATUS FOR LOCATING PATTERNS IN AN OPTICAL IMAGE

[75] Inventor: William M. Silver, Medfield, Mass.

[73] Assignee: Cognex Corporation, Natick, Mass.

[21] Appl. No.: 240,079

[22] Filed: May 9, 1994

Related U.S. Application Data

[63] Continuation of Ser. No. 828,241, Jan. 30, 1992, abandoned.

[51] Int. Cl.$^6$ ............................................. G06K 9/20
[52] U.S. Cl. ................................. 382/202; 382/151
[58] Field of Search ............................. 382/48, 8, 18,
  382/53, 141, 145, 151, 194, 192, 282, 273;
  348/135; 356/400, 401; 250/561

[56] References Cited

U.S. PATENT DOCUMENTS

| | | | |
|---|---|---|---|
| 3,936,800 | 2/1976 | Ejiri et al. | 382/18 |
| 3,968,475 | 7/1976 | McMahon | 382/48 |
| 4,115,762 | 9/1978 | Akiyama et al. | 382/48 |
| 4,200,861 | 4/1980 | Hubach et al. | 382/34 |
| 4,254,400 | 3/1981 | Yoda et al. | 382/18 |
| 4,441,206 | 4/1984 | Kuniyoshi et al. | 382/48 |
| 4,630,306 | 12/1986 | West et al. | 382/21 |
| 4,736,437 | 4/1988 | Sacks et al. | 382/48 |
| 4,783,828 | 11/1988 | Sadjadi | 382/22 |
| 4,876,728 | 10/1989 | Roth | 382/8 |
| 4,907,169 | 3/1990 | Lovoi | 382/8 |
| 4,922,543 | 5/1990 | Ahlbom et al. | 382/48 |
| 4,926,492 | 5/1990 | Tanaka et al. | 382/18 |
| 4,955,062 | 9/1990 | Terui | 382/48 |
| 4,959,898 | 10/1990 | Landman et al. | 29/705 |
| 4,972,359 | 11/1990 | Silver et al. | 364/728.05 |
| 5,073,958 | 12/1991 | Imme | 382/22 |
| 5,081,656 | 1/1992 | Baker et al. | 382/8 |
| 5,091,861 | 2/1992 | Geller et al. | 364/474.34 |
| 5,113,656 | 5/1992 | Cipolla et al. | 382/8 |
| 5,133,022 | 7/1992 | Weideman | 382/18 |
| 5,134,575 | 7/1992 | Takagi | 364/552 |

*Primary Examiner*—Joseph Mancuso
*Assistant Examiner*—Gerard Del Rosso
*Attorney, Agent, or Firm*—David J. Powsner; Russ Weinzimmer

[57] ABSTRACT

The invention provides methods and apparatus for processing an image to identify the position of a linear pattern—for example, a line or a cross-hair comprising a plurality of intersecting lines. The system performs a first processing step for generating a projection of the image along axes aligned with an expected position of the linear patterns. A second processing step performs a mirror symmetry filtering on the projection to bring out a single peak corresponding to the center of the linear pattern. To further isolate that peak, the system performs a further filtering operation to remove peaks of lesser slope angle, so that only a highly sloped spike corresponding to the linear pattern will remain. The position of the center that peak corresponds to the center of the linear pattern in the original input signal.

16 Claims, 6 Drawing Sheets

METHOD AND APPARATUS FOR LOCATING PATTERNS IN AN OPTICAL IMAGE

This application is a continuation of U.S. patent application Ser. No. 07/828,241 filed on Jan. 30, 1992, now abandoned, for "Method and Apparatus for Locating Patterns in an Optical-Image", the contents of which are hereby expressly incorporated.

FIELD OF THE INVENTION

This invention relates to machine vision, and more particularly, to methods and apparatus for accurately locating linear patterns, e.g., a cross-hairs, in an optical image.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Automated product assembly and manufacturing processes often rely on machine vision to determine the position of a component being processed. Typically, a linear pattern, such as a cross-hair, is used as a reference point for precision alignment.

Various methods of machine vision positioning are currently practiced. Among the primary ones are variations on the general Hough transform and correlation (template matching). With respect to the latter, there exists binary exclusive-OR correlation and, more recently, gray-scale normalized correlation. One common element of these prior art methods is that they require, as input, an image template of the pattern they are to locate.

As a component undergoes various stages of assembly or manufacture, the appearance of the alignment pattern may change. For example, etching and masking of a semiconductor wafer can alter the contrast, definition and thickness of cross-hairs embedded in the wafer. Thus, in order to be effective during the entire assembly process, the prior art methods typically require many image templates. Unfortunately, the actual appearance of a locating pattern on a component is not always predictable, frustrating even the use of multiple ideal template images.

A further drawback of prior art systems is that they consume excessive time in comparing actual optical images to the multiple template images.

In view of the foregoing, an object of the invention is to provide an improved vision system and, more particularly, improved methods and apparatus for accurately locating the center of a linear pattern, e.g., a line or a cross-hair, in an optical image.

Still another object of the invention is to provide a machine vision positioning system that does not rely on an object template in order to position a piece.

Yet another object of the invention is to provide a system capable of positioning a component notwithstanding changes in its appearance during processing.

SUMMARY OF THE INVENTION

The aforementioned objects are attained by the invention, which provides machine vision methods and apparatus capable of quickly and accurately locating linear patterns, such as lines, or cross-hairs made up of intersecting lines, on a component.

In one aspect, the invention provides an apparatus for processing a component image to identify the position of a linear pattern thereon. The apparatus includes a first processing element for generating a projection of the image along an axis substantially aligned with an expected orientation of the linear pattern. As described further below, a projection is essentially a one-dimensional "profile" of the input image.

If a linear pattern in the image is aligned with the projection axis, edges of that pattern will correspond with peaks on an otherwise flat, or substantially flat, profile. An apparatus according to the invention further includes a processing element for performing "mirror symmetry" filtering on the projection. That filtering relies on the symmetry of the edge peaks to bring out a single peak corresponding to the center of the linear pattern.

To isolate that center peak, the apparatus includes a notch detection element that operates on the mirror symmetry filter output to filter out lesser peaks of low slope angle, so that only a highly sloped spike corresponding to the linear pattern of interest will remain.

The center of that peak corresponds to the center of the linear pattern in the original input signal. The apparatus, accordingly, includes a peak finding element that determines the location of the peak center. To improve accuracy of that determination, the apparatus can interpolate a peak position from the apparent peak and the two neighboring points on opposite sides of that apparent peak.

An apparatus of the type described above can determine the location of a line in an input image, e.g., a "street" in a semiconductor wafer. Alternatively, it can to locate a single "hair" of a cross-hair pattern.

The invention accordingly provides, in another aspect, an apparatus for locating the center of a cross-hair, made up of intersecting lines, contained in an input image. That apparatus is constructed and operated as described above, and is additionally adapted to take projections along two axes, each of which is aligned with an expected orientation of the corresponding hairs. That apparatus also performs mirror symmetry and notch-detection filtering on both projections to permit location of the centers of each hair. The center of the cross-hair is, then, determined to lie at the intersection of the hairs.

In still other aspects, the invention provides methods for linear pattern location corresponding to the operation of the apparatus described above.

As will be appreciated from this summary, and from the subsequent detailed description, features of the invention include its ability to locate linear patterns without matching them with image templates, as otherwise required in the prior art. Another feature of the invention is its ability to detect very low contrast linear patterns and pattern edges. This results, in part, from the use of projections which greatly enhance the signal-to-noise ratio of the image signal. Moreover, the invention demands two-dimensional processing only for the generation of projections, utilizing single-dimensional processing for all other sophisticated operations.

BRIEF DESCRIPTION OF THE DRAWINGS

Other features, objects and benefits of the invention can be more clearly understood with reference to the following description of an illustrative embodiment, and to the drawings, in which.

DETAILED DESCRIPTION OF THE ILLUSTRATED EMBODIMENT

Figure 1:
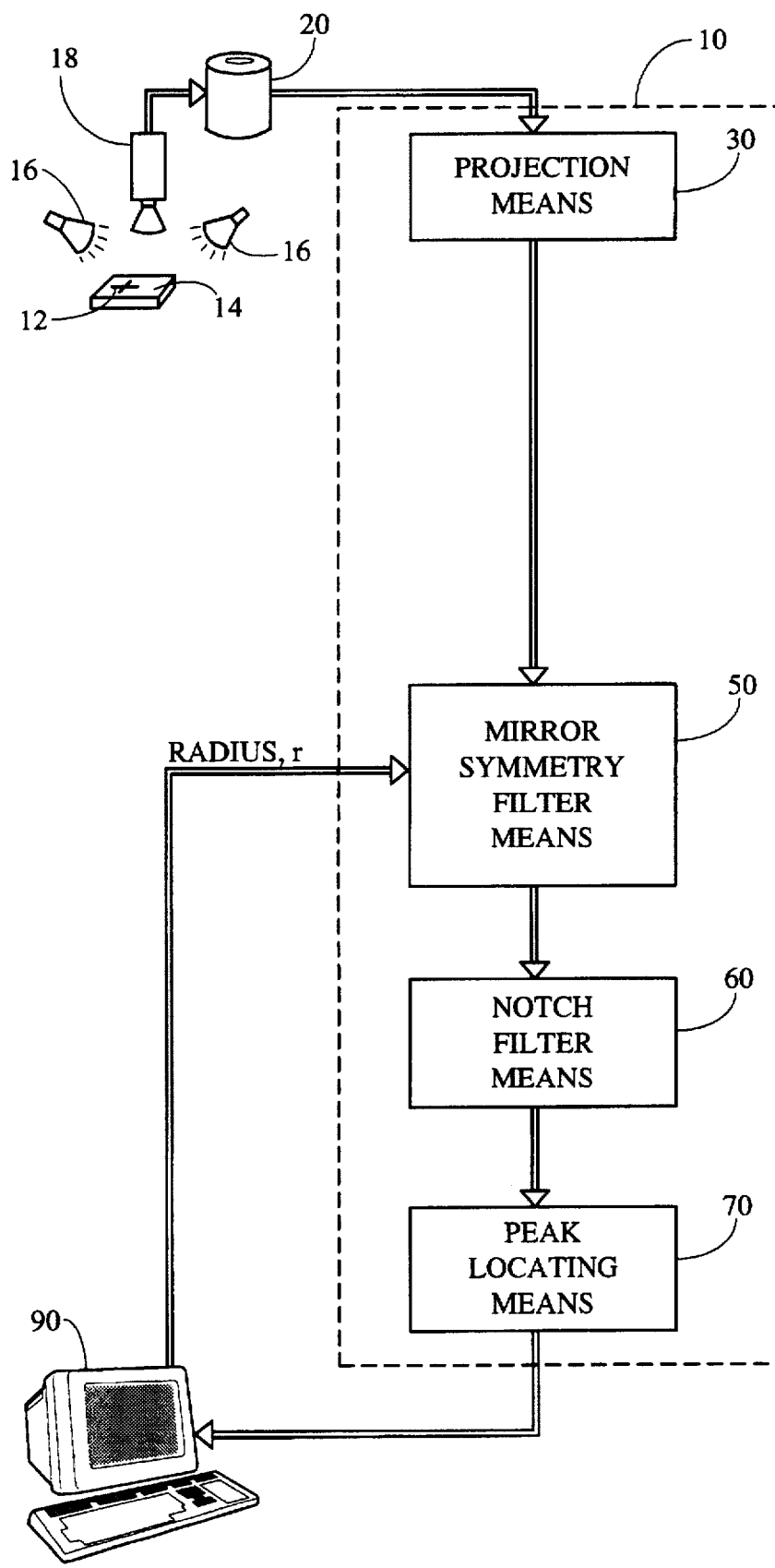
FIG. 1 is a schematic representation of a preferred embodiment of an apparatus according to the invention.
Figure 2:
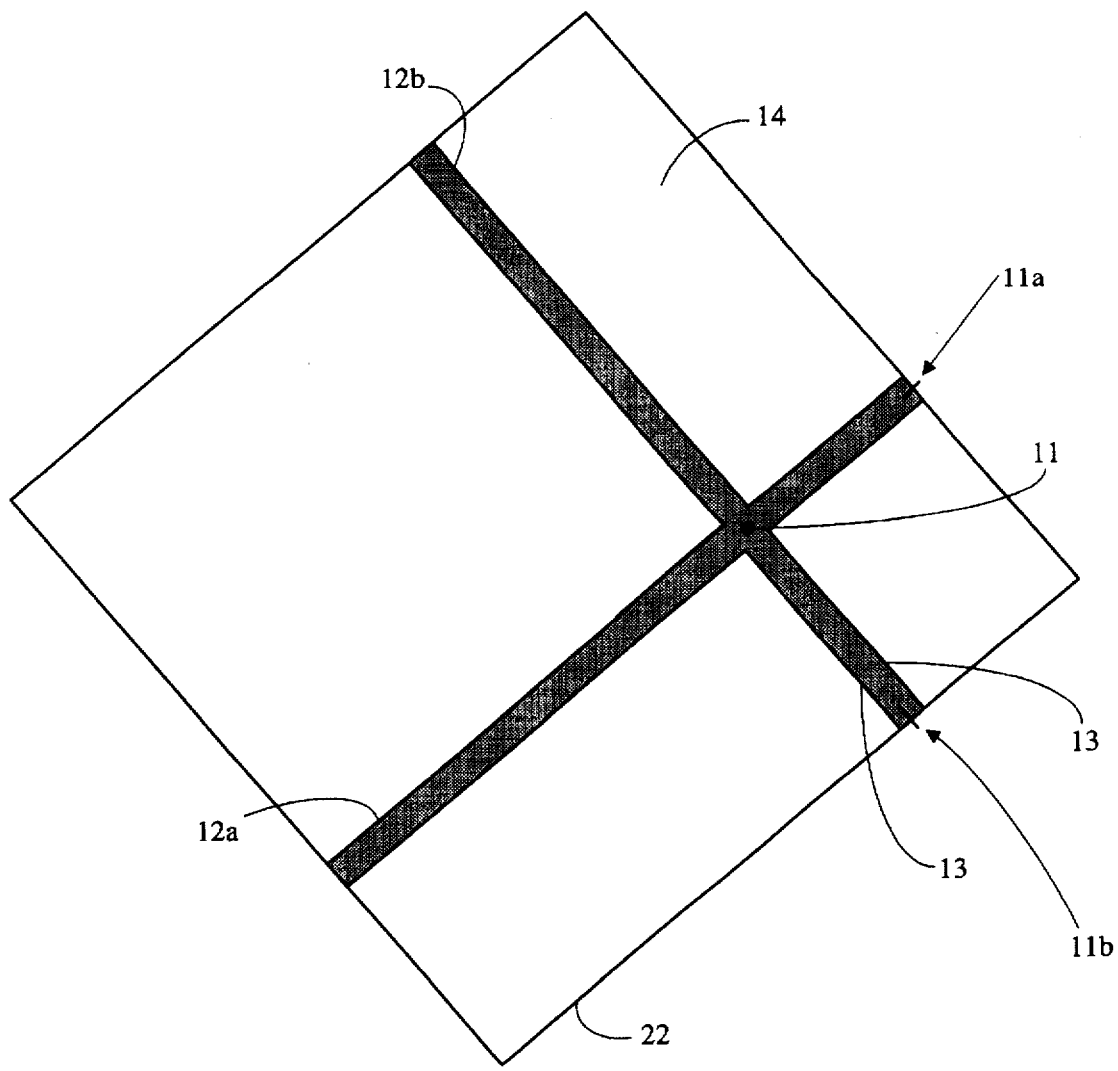
FIG. 2 is a perspective view of a linear pattern on a surface.

With reference now to FIGS. 1 and 2, a schematic representation of an apparatus 10 for accurately locating a cross-hair 12, comprising intersecting linear patterns 12a, 12b is shown on a surface 14.

The surface 14 is illuminated, for example, by lamps 16 to facilitate the creation of an image signal by a video camera 18. The output of that camera is electrically connected to an optional storage device 20 that can store the image prior to processing. As shown in the illustration, the output of storage device 20 is routed to a projection element 30, which performs the first stage of location processing, as discussed below.

Video camera 18, lamps 16, and storage device 20 operate and are configured in a manner conventional in the art.

Figure 3:
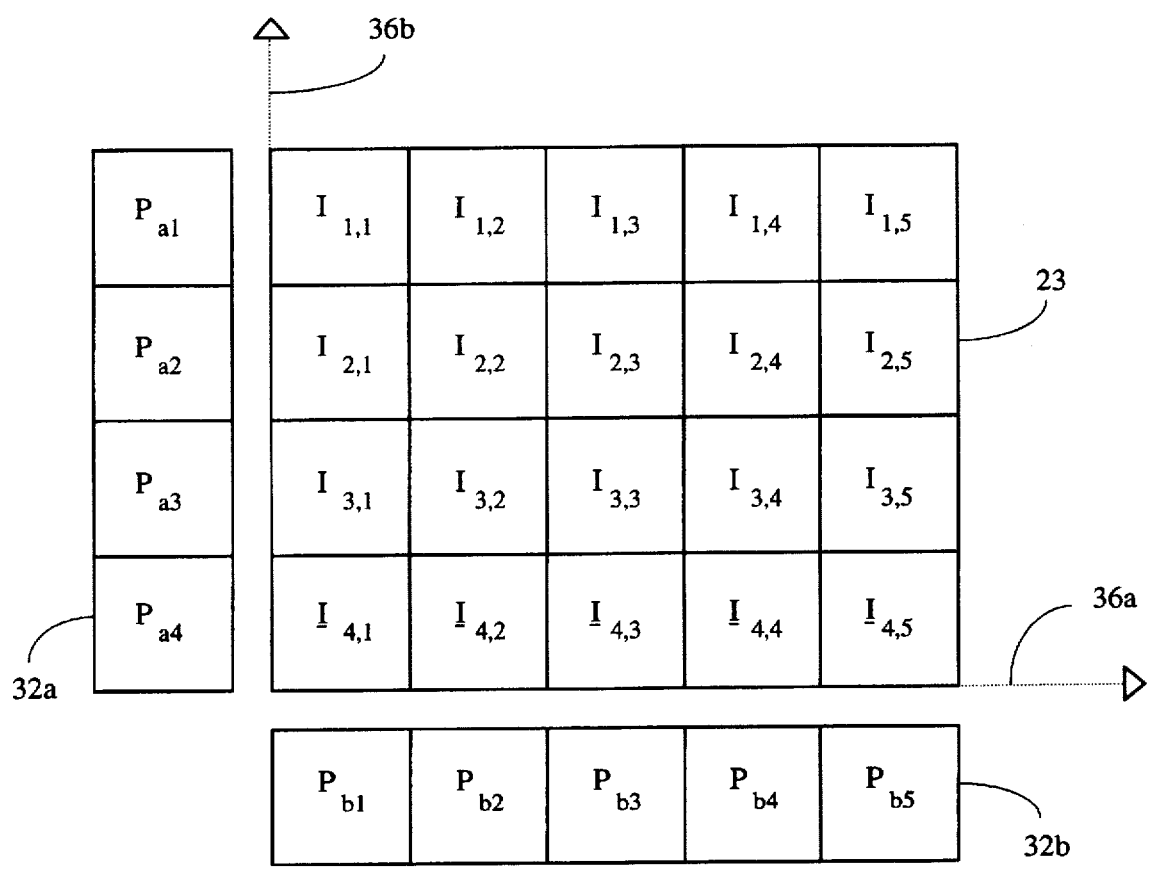
FIG. 3 is a planar view of a representative segment of an image signal and corresponding projections.

A digital image signal 22 output by camera 18 is made up of individual pixels, $I_{x,y}$. A representative portion 23 of an image signal 22 is illustrated in FIG. 3, showing pixels designated $I_{1,1}, I_{1,2}, \ldots I_{4,5}$.

The projection element 30 sums pixels along directions parallel to axes 36a, 36b corresponding to the expected orientation of the linear patterns 12a, 12b to be inspected. For example, if the linear patterns are oriented with the pixel grid itself, the projection summations are conducted along the grid's rows and columns; otherwise, they are conducted in appropriate directions. The projection element generates, for those sums, projection signals 32a, 32b, respectively.

The aforementioned projection signals can be generated in a manner conventional in the art. Preferably, they are generated in accord with the techniques revealed in U.S. Pat. No. 4,972,359, assigned to the assignee hereof. A software listing of a more preferred implementation of projection element 30 is provided in Appendix A, filed herewith.

By way of example, illustrated projection signal 32a includes elements $Pa_1$ through $Pa_4$, generated in accord with the following mathematical function (which assumes that the pixel grid is aligned with the axes 36a, 36b).

$$Pa_i = \sum_{n=1}^{5} I_{i,n} \qquad \text{Eq. 1}$$

Projection signal 32b, including elements Pb1 through Pb5, is generated by a like formula.

As noted above, each projection signal 32 provides a profile of the image signal 22 in a direction parallel to the corresponding axis. Thus, the linear pattern aligned with the axis is emphasized, while image "noise" is effectively averaged out.

For sake of simplicity, the discussion which follows focuses on processing of a projection signal corresponding to a single linear pattern, e.g., "hair" 12a of cross-hair 12. It will be appreciated that, in order to determine the location of cross-hair 12, like processing is performed on the other "hair" 12b.

Figure 4A:
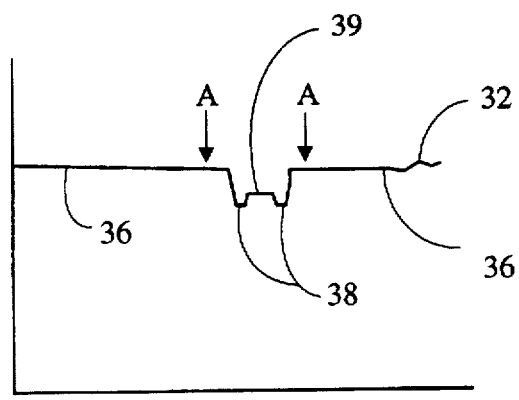
FIG. 4a is a plot of a projection signal.

An exemplary projection signal 32 is illustrated in FIG. 4a, where three features of interest are shown: the portions 36, corresponding to the average background intensity value of the image scene; the portion 39 corresponding to the average intensity value of the central region of the linear pattern or "hair"; and the portion 38, corresponding to the average intensity of the boundary between the linear feature and the background. It will be appreciated that the features 38 and 39 can be relatively brighter than, darker than, or equal to, the background 36, in any combination. It will be further appreciated, however, that features 38 and 39 cannot both be equal to the background, because the pattern would not be detectable. Further fluctuation in the illustrated projection signal 32 is due, for example, to noise in the image signal 22.

Figure 4B:
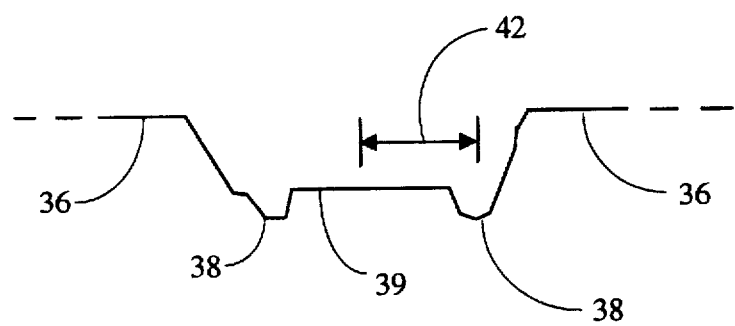
FIG. 4b is a detail of the plot of a projection signal taken along lines A—A.

The image processor 10 performs further processing on the projection signal in order to provide an accurate indication of the location of the center of the linear pattern 12a on the surface 14. Particularly, referring to FIG. 1, exemplary projection signal 32 is processed by mirror symmetry filter element 50, using an input radius r, to derive a peak corresponding to the center of the pattern 12a. The radius, r, represents one-half of the expected width of the linear pattern, and is illustrated as 42 of FIG. 4b.

The radius r is input, for example, by the user, e.g., via console 90. The value of radius r is selected to accommodate the expected variation of thickness in the linear pattern caused by, for example, processing of the underlying component. While the exact value of the radius, r, is not critical, it is preferably selected to be slightly larger than the largest expected half-width of the linear pattern.

Mirror symmetry filter element generates the filtered signal, S, from exemplary projection signal P and corresponding radius, r, in accord with the mathematical function $$Si = \sum_{a=1}^{r} |P_{i+a} - P_{i-a}| \qquad \text{Eq. 2a}$$

for each value of i between r and the length of the projection signal P minus r.

Alternatively, the mirror symmetry filter element can generate the filtered signal, S, in accord with the mathematical function $$Si = \sum_{a=0}^{r-1} |P_{i+a} - P_{i-a-1}| \qquad \text{Eq. 2b}$$

Those skilled in the art will appreciate that Equations 2a and 2b, while similar, produce resultant signals S which are effectively one-half pixel out of phase with one another.

With respect to Eqs. 2a and 2b, at each point i along an axis 36, the projection signal 32 value between zero and r on the left side of the point is subtracted from the value the same distance to the right of the point. An absolute value is calculated, and is added to the absolute values of the differences at the other points between zero and r. This gives an indication of how mirror symmetric the projection 32 is about point i. The same algorithm is run along the length of the projection signal 32, giving an indication of the overall symmetrical quality of the projection signal 32.

Figure 4C:
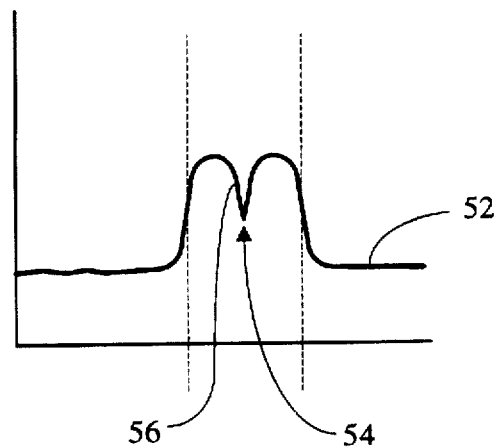
FIG. 4c is a plot of a mirror symmetry signal.

As illustrated in FIG. 4c, the mirror symmetry signal 52 is low, indicating a high degree of symmetry, in regions of approximately uniform background, e.g., at distances more than one radius away from the linear pattern 12a. Within one radius of the pattern, the value of S rises, indicating a low degree of symmetry. The signal S remains relatively high at all points within radius r of the center of the pattern, except for a very small region surrounding the exact center of the feature. This is revealed as a very sharp, downward spike 56 in signal S, whose extreme point 54 corresponds to the center of the exemplary linear pattern 12a.

The apparatus 10 performs still further processing in order to identify the location of the center of the linear pattern 12a. The goal is to distinguish the low signal value 56, corresponding to the true center of the linear pattern 12a, from the other low values corresponding to the uniform background. This is performed by notch detection element 60, which operates on the mirror symmetry signal S with a mask to generate a peak location signal L further emphasizing the peak 56.

The notch detector element 60 generates the peak location signal L in accord with the mathematical function:

$$L_i = \min\left(\frac{1}{p}\sum_{j=0}^{p-1} S_{i+j}, \frac{1}{p}\sum_{j=p+2z+n}^{2p+2z+n-1} S_{i+j}\right) - \frac{1}{n}\sum_{j=p+z}^{p+z+n-1} S_{i+j} \quad \text{Eq. 3}$$

based on a mask, M, which can be depicted as follows:

| p | z | n | z | p |
|---|---|---|---|---|
| P | Z | N | Z | P |
| 0 | p | p+z | p+z+n | p+2z+n | 2p+2z+n |

In a preferred embodiment, the notch mask has a central notch one pixel wide of negative one unit amplitude. On either side of the notch, there are one pixel wide shoulders of zero amplitude. At the far ends, the shoulders notches are two pixels wide and positive one-half unit high. That is, p=2, z=1 and n=1, while P=½, Z=0 and N=−1. This preferred mask is as follows:

½ ½ 0 −1 0 ½ ½

Figure 4D:
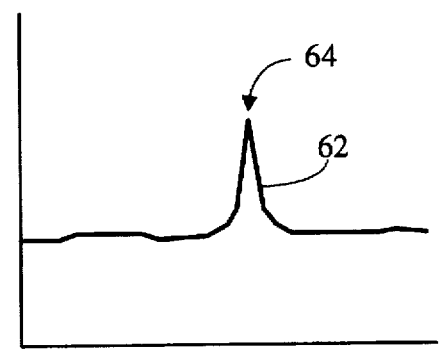
FIG. 4d is a plot of an output of a notch-detection element.

In effect, a mask of this shape represents a negative-going notch locator, filtering out all areas of the symmetry signal 52 which are low due to the uniform background. The result of the operation of this filter on the mirror symmetry signal 52 of FIG. 4c is illustrated in FIG. 4d.

The spike 62 and its peak 64 represent an accurate indication of the relative position of the center 11a of the exemplary linear pattern 12a parallel the axis 36 of interest.

In a less preferred embodiment, the function of notch detection element 60 may be performed by a laplacian filter element, which convolves the mirror symmetry signal S with a mask to generate a peak location signal L further emphasizing the peak 56.

As those skilled in the art will appreciate, convolution involves taking the "dot product" of successive overlapping windows of the mirror symmetry signal S with a pixel mask M, having elements $M_1, M_2, \ldots M_k$. Thus, the laplacian estimator element 60 generates the peak location signal L in accord with the mathematical function:

$$L_i = \sum_{j=1}^{k} S(i+j-1) \cdot M_j \quad \text{Eq. 4}$$

A mask for such an operation is as follows:

¼ −¼ 0 1 0 −¼ −¼

A further refinement of the position of the peak 56 is made possible by implementing a peak location element 70 as illustrated in FIG. 1.

Figure 5:
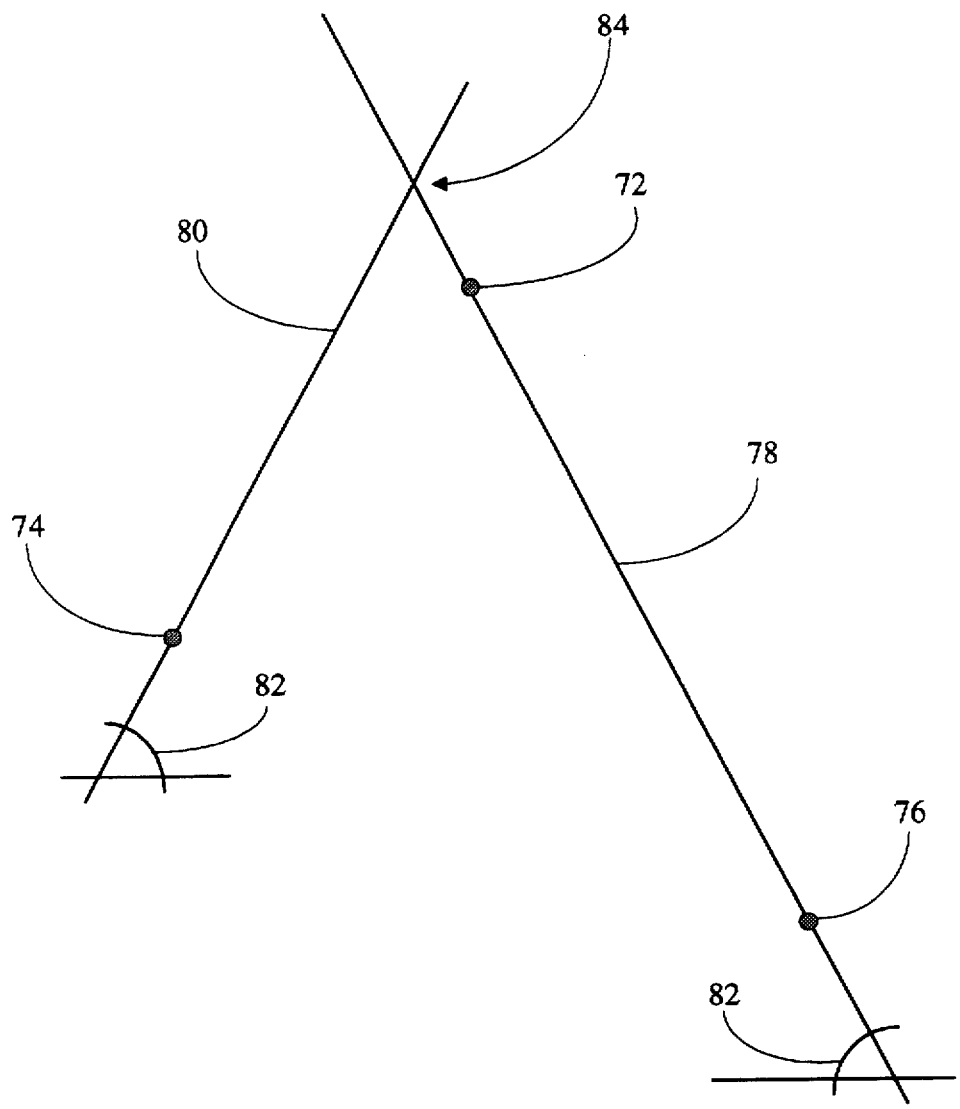
FIG. 5 is a diagram showing the function of the peak locating element.

Referring to FIG. 5, the point which has the highest amplitude in spike 62—i.e., the point representing the apparent peak of the peak location signal L—is identified as point 72. On either side of that point 72 are neighboring points 74 and 76.

In order to better determine the actual peak, and thereby the actual center of the linear pattern 12a, the peak location element 70 determines the location of a point 84 representing the intersection of lines 78 and 80. The line 78 is determined as that line which connects apparent peak 72 and lowest-value neighbor 76, while line 80 is determined as that line passing through highest-value neighbor 74 and having a slope 82 which is the negative of that of line 78, as illustrated.

The point 84 where the two line segments 78, 80 intersect is identified as a truer approximation of the center 11a of the linear pattern 12a.

In an alternative to the aforementioned method of peak detection, the processor 10 generates two mirror symmetry signals, $S_1$ and $S_2$, from each projection signal, P. The first mirror symmetry signal $S_1$ is generated according to Eq. 2a, while the second, $S_2$, is generated according to Eq. 2b. Each of the signals $S_1$, $S_2$ are then passed through notch detection element 60 to produce notch detection signals $L_1$ and $L_2$, respectively. Peak detection proceeds as described above, except insofar as apparent peak point 72 is determined by signal $L_1$, while neighboring points 74 and 76 are determined by signal $L_2$.

In order to determine the coordinates 11 of a cross-hair pattern 12, the apparatus 10 generates a projection signal Pa, Pb of the image signal I along respective axes 36a, 36b. It then uses the input radius r associated with each of those projections. The apparatus, in turn, determines a mirror symmetry signal Sa, Sb corresponding to respective ones of the projections signals Pa, Pb. And, from those mirror symmetry signals Sa, Sb, the apparatus generates peak location signals La, Lb, respectively.

Upon locating the center of the corresponding linear patterns 12a, 12b in the manner described above, the apparatus 10 generates a signal representing the center of the cross-hair 12 at the point of intersection of the two patterns 12a, 12b. That signal may be then be output to terminal 90 or positioning apparatus, not shown.

A further understanding of the invention may be attained by reference to Appendix A, filed herewith, disclosing a preferred software implementation of aspects of the invention described and claimed herein.

SUMMARY

Described above are improved machine vision methods and apparatus capable of quickly and accurately locating linear patterns, such as wafer streets or cross-hairs, on a component. Unlike the prior art, systems constructed in accord with the invention does not require an input template pattern.

Those skilled in the art will appreciate that the embodiments described above are illustrative only, and that other systems in the spirit of the teachings herein fall within the scope of the invention. Thus, for example, it will be appreciated that methods and apparatus other than that described above for mirror symmetry filtering can be used. Likewise, the invention embraces methods other than notch detection (e.g., the Laplacian technique disclosed above) for filtering the output of the mirror symmetry filter. Still further, the use of peak detection methodologies and apparatus other than, but falling within the spirit of, those described above is contemplated by the invention. Moreover, it will be appreciated that the methods and apparatus described herein can be used to identify linear patterns other than "streets" and cross-hairs.

And, of course, that systems constructed in accord with the invention have applicability outside the field of semiconductor wafer processing. Thus, for example, they can be used to locate cross-hairs in connection with graphics printing of color overlays, and in positioning components during parts assembly or inspection.

These and other such uses, as well as modifications, additions and deletions to the techniques described herein may fall within the scope of the invention.

IN THE UNITED STATES PATENT AND TRADEMARK OFFICE

Appendix A to

Patent Application for
METHOD AND APPARATUS FOR LOCATING
PATTERNS IN AN OPTICAL IMAGE C Language
Software Listing of Preferred Implementation cross_finder.v

```c
/*
 *
 *      Copyright (c) $Date$
 *      Cognex Corporation, Needham, MA 02194
 *
 *      $Source$ yor:/home/milind/mrs/patent/cross_finder.v
 *      $Revision$
 *      $Locker$
 *
 */ static char     *header = "$Header$";

/*
  Defines the three functions that are used for:
  1. Projection.
  2. Applying a symmetry filter to the image.
  3. Applying a Laplace filter to the image.
  */

/****************************************
 ** f_project *** Image Projection       *
 ****************************************
 **
 */
cip_buffer *f_p(buff,proj_buff,angle)
cip_buffer *buff, *proj_buff;
double angle;
{
   short i;
   ctm_timer time_1;
   cmap_params *mp_param;

mp_param=(cmap_params *)cvc_alloc(sizeof(cmap_params));
   cu_clear(mp_param,sizeof(cmap_params));

mp_param->wf = cmap_identity;
   mp_param->mp.ab.zero = 0;
   mp_param->mp.ab.one = (int)pow(2.0,(double)buff->depth) - 1;

ctm_begin(&time_1);
   proj_buff = cpro_project(buff,0,mp_param,angle);
/*
   printf("\nProjection time %d",ctm_read(&time_1));
*/ free(mp_param);
   mp_param = NULL;

return proj_buff;
}
```

```
/***********************************************
** f_s **** Symmetry Filter                    *
************************************************
**
*/
cip_buffer *f_s(buff,sym_buff,sym_filter_size)
cip_buffer *buff, *sym_buff;
int sym_filter_size;
{
  int i,j,sym_val,buff_end;
  ctm_timer time_1;

if(!sym_buff) {
    sym_buff = cip_create(buff->width,1,32);
  }
  cip_set(sym_buff,0);

buff_end = buff->width - sym_filter_size;
  sym_val = 0;

ctm_begin(&time_1);
  for(i=sym_filter_size;i<buff_end;i++) {
    for(j=0;j<sym_filter_size;j++) {
      sym_val += abs(buff->get(buff,i-j,0) - buff->get(buff,i+j,0));
    }
    sym_buff->put(sym_buff,i,0,sym_val);
    sym_val = 0;
  }
/*
  printf(" ,Symmetry Filter time = %d",ctm_read(&time_1));
*/ return sym_buff;
}
``` cross_finder.v 

```
/*******************************************
** f_1 **** Laplace Filter                 *
********************************************
**
.           (+)
.           --
.          |  |
.       0  |  |
. ---------------------------------
. |  |        |  |
. |  |        |  |
. ----        ----
. (-)          (-)

30,0,2
*/
cip_buffer *f_1(buff,lap_buff,sym_filter_size,lap_zero,lap_one)
cip_buffer *buff, *lap_buff;
int sym_filter_size, lap_zero, lap_one;
{
  int i,j,buff_start,buff_end,lap_val,lap_end;
  int lap_left, lap_right;
  ctm_timer time_1;

if(!lap_buff) {
    lap_buff = cip_create(buff->width,1,32);
  } cip_set(lap_buff,0);

buff_start = sym_filter_size+lap_zero+lap_one;
  buff_end = buff->width-sym_filter_size-lap_zero-lap_one;

lap_end = lap_zero+lap_one;
  lap_left = 0;
  lap_right = 0;

ctm_begin(&time_1);
  for(i=buff_start;i<buff_end;i++) {
    lap_val=lap_end*buff->get(buff,i,0);
    for(j=lap_zero+1;j<=lap_end;j++) {
      lap_val -= MIN(buff->get(buff,i-j,0),buff->get(buff,i+j,0));
    }
    lap_buff->put(lap_buff,i,0,lap_val);
  }
/*
  printf(" ,Laplace Filter time = %d\n",ctm_read(&time_1));
*/
  return lap_buff;
}
``` cross_finder.v

```c
/*******************************************
 ** f_m **** Finding Max value             *
 *******************************************
 **
 */
int f_m(buff,flag,sym_filter_size,lap)
cip_buffer *buff;
bool flag;
int sym_filter_size,lap;
{
  int i;
  int max_pix,max_i;
  int buff_start, buff_end;

max_pix=0;
  max_i = 0;

buff_start = sym_filter_size+lap;
  buff_end = buff->width-sym_filter_size-lap;

for(i=buff_start;i<buff_end;i++) {
    max_pix = MAX(max_pix,buff->get(buff,i,0));
    if(max_pix == buff->get(buff,i,0)) {
      max_i = i;
    }
  } if(flag)   return max_i;
  else       return max_pix;

}
``` cross_finder.v

```c
/*******************************************
** f_min_pix_pos **** Finding Min value*
*******************************************
**
*/
int f_min_pix_pos(buff,flag,sym_filter_size,lap)
cip_buffer *buff;
bool flag;
int sym_filter_size,lap;
{
  int i;
  int min_pix,min_i;
  int buff_start, buff_end;

min_pix=buff->get(buff,(int)buff->width/2,0);
  min_i = 0;

buff_start = sym_filter_size+lap;
  buff_end = buff->width-sym_filter_size-lap;

/* exclude zeros */
  for(i=buff_start;i<buff_end;i++) {
    if(buff->get(buff,i,0)) {
      min_pix = MIN(min_pix,buff->get(buff,i,0));
      if(min_pix == buff->get(buff,i,0)) {
        min_i = i;
      }
    }
  } if(flag)   return min_i;
  else       return min_pix;

}
``` cross_finder.v

```
/*****************************************
** iclp_plot1d_in_window **** Plot     *
*****************************************
**
*/
double
  iclp_plot1d_in_window (data, window_, horiz_, signed_, connect_,
                         xscale_, xoffset_, max_pel_,
                         fgnd_, bgnd_, border1_, border2_)
cip_buffer     *data, *window_;
bool           horiz_, signed_, connect_;
double         xscale_, xoffset_;
int            max_pel_;
int            fgnd_, bgnd_, border1_, border2_;
{
  cip_buffer   window, plot;
  bool         horiz, signed, connect;
  double       xscale, xoffset;
  int          max_pel;
  double       yscale, yoffset;
  double       ymin, ymax;
  int          fgnd, bgnd, border1, border2;
  int          depth, size;

depth = data->depth;

if (window_) {
    cu_copy (window_, &window, sizeof(cip_buffer));
    horiz = horiz_; signed = signed_; connect = connect_;
    xscale = xscale_; xoffset = xoffset_;
    max_pel = max_pel_;
    fgnd = fgnd_; bgnd = bgnd_; border1 = border1_; border2 = border2_;
  }
  else {
    horiz = 1; signed = (depth > 8); connect = 1;
    xscale = 1.; xoffset = 0.;
    max_pel = 0;
    fgnd = 63; bgnd = 32; border1 = 0; border2 = 32;
    cip_window (caq_image, &window,
                (caq_image->width - data->width - 2)/2,
                (caq_image->height - 130)/2,
                data->width + 2, 130);
  } cgr_outline (&window, border1);
  cip_window (&window, &plot, 1, 1, window.width - 2, window.height - 2);
  size = ((horiz) ? plot.height : plot.width);
  if (bgnd >= 0) cip_set (&plot, bgnd);

{
    int     i, p;
    double  y;

for (i = 0; i < data->width; i++) {
      p = data->get (data, i, 0);
      if (signed) switch (depth) {
        case 8:  y = (int) ((char) (p & 0xff)); break;
        case 16: y = (int) ((short) (p & 0xffff)); break;
        default: y = p; break;
      }
      else switch (depth) {
        case 8:  y = (unsigned int) ((unsigned char) (p & 0xff)); break;
        case 16: y = (unsigned int) ((unsigned short) (p & 0xffff)); break;
``` cross_finder.v

```c
    default: y = (unsigned int) p; break;
    }
    if (i == 0) ymax = ymin = y;
    else if (y < ymin) ymin = y;
    else if (y > ymax) ymax = y;
  }
  if (max_pel && ymax <= max_pel && ymin >= ((signed) ? - max_pel : 0)) {
    ymax = max_pel;
    ymin = (signed) ? -max_pel : 0;
  }
  if (!window_ && signed && ymin >= 0) signed = 0;
  if (signed) {
    ymax = (ymax > -ymin) ? ymax : -ymin;
    ymin = -ymax;
  }
  else ymin = 0.;
  if (ymax - ymin != 0.)
    yscale = -(size - 1) / (ymax - ymin);
  else
    yscale = -(size - 1) / 64;
  yoffset = ymax * -yscale;
}

{
  int       i, j, ink, y;
  double    step;

for (i = 3; i >= 0; i--) {
    step = ymax / (1 << i);
    ink = (border1 + ((1 << i) - 1) * border2) / (1 << i);
    for (j = 2 << i; j; j--) {
      y = yoffset + yscale * (ymax - j * step);
      if (horiz)
        cgr_iline (&plot, 0, y, plot.width-1, y, ink);
      else
        cgr_iline (&plot, y, 0, y, plot.height-1, ink);
    }
  }
}

{
  int i, x, y, p, old_x = -1, old_y = -1;

for (i = 0; i < data->width; i++) {
    x = i * xscale + xoffset + 0.5;
    p = data->get (data, i, 0);
    if (signed) switch (depth) {
      case 8:  y = yoffset + yscale * ( (int) ((char) (p & 0xff)) ); break;
      case 16: y = yoffset + yscale * (short) p; break;
      case 32: y = yoffset + yscale * (long)  p; break;
      default: y = yoffset + yscale * (long)  p; break;
    }
    else switch (depth) {
      case 8:  y = yoffset + yscale * ( (int) ((unsigned char) (p & 0xff)) ); break;
      case 16: y = yoffset + yscale * (unsigned short) p; break;
      case 32: y = yoffset + yscale * (unsigned long)  p; break;
      default: y = yoffset + yscale * (unsigned long)  p; break;
    }
    if (horiz) {
      if (x >= 0 && x < plot.width && y >= 0 && y < plot.height) {
        if (connect && old_x >= 0)
          cgr_line (&plot, old_x, old_y, x, y, fgnd);
        else
          plot.put (&plot, x, y, fgnd);
``` cross_finder.v

```
        old_x = x;
        old_y = y;
      }
      else old_x = -1;
    }
    else {
      if (y >= 0 && y < plot.width && x >= 0 && x < plot.height) {
        if (connect && old_y >= 0)
          cgr_line (&plot, old_y, old_x, y, x, fgnd);
        else
          plot.put (&plot, y, x, fgnd);
        old_x = x;
        old_y = y;
      }
      else old_y = -1;
    }
  }
} return yscale;
}
/****************************************/
```

```
92/01/28
10:18:02                    image_project.c                                           
/*
 *      Copyright (c) $Date: 91/11/21 16:34:25 $
 *      Cognex Corporation, Needham, MA 02194
 *
 *      $Source: /nfs/lex/products/x000/src/cpro/image_project.c,v $
 *      $Revision: 1.13 $
 *      $Author: scl $
 *      $Locker:  $
 */

/* ++ */
/* image_project()
 * Project Image onto Line at Arbitrary Angle
 * For now, works only between -45 and +45 degrees.
 */
/* -- */ static char    *header = "$Header: /nfs/lex/products/x000/src/cpro/image_project.c,v 1.13
  91/11/21 16:34:25 scl Exp $";

#include <which_bd.h>
#if C_BOARD==C_UNIX
#include <histogram_def.h>
histogram *image_project()
{ unsupported ("image_project");
}
endif if C_BOARD!=C_UNIX
include <cip.h>
#include <cct.h>
#include <cpro_er.h>
#include <cpro_def.h>
#include <cchk_er.h>
#include <blob.h>
#include <vm7s_def.h>
include <vcp.h> extern void project_strip();
extern int project_table [16];

static char loop_adjust_table [16] =
  { 0, 0, 0, 0,
    1, 0, 0, 0,
    1, 1, 0, 0,
    1, 0, 0, 0};

/* loop_control() returns values in d5,d6,d7 which are used to
 * control the execution of project_strip(). If project_strip() is to
 * be called in a loop, using the same control values, the variable
 * "width" passed to loop_control() must be even to preserve the image
 * and model alignment.
 */ void loop_control (image, width, d5, d6, d7)
  register cip_buffer *image;
  register int width;
  int *d5, *d6, *d7;
  { register int
      code,
      wodd,
      weven;
```

```
code = (((int)(image->rat[0] + image->x_offset) & 1) << 3) + (width & 3);
weven = (width >> 2) - loop_adjust_table [code];
wodd  = (width >> 2) - loop_adjust_table [code + 4];

/* There is a special case when the image alignment is odd, the
 * model alignment is even, and the width is 1.
 */ if (weven < 0)
  { weven = 0;
    *d5 = ((project_table[code + 4] - project_table [0])
         & 0xFFFF) * 0x10001;
  }
else
    *d5 = ((project_table [code] - project_table [0]) & 0xFFFF) +
         ((project_table [code + 4] - project_table [0]) << 16);

*d6 = ((8 - (weven & 7)) + ((8 - (wodd & 7)) << 16)) << 1;

*d7 = (weven >> 3) + ((wodd >> 3) << 16);
} histogram *image_project (ip, tan_theta, projection, z_hist)
register cip_buffer *ip;
int tan_theta;
histogram *projection;
histogram **z_hist;
{
   int bn, *bins;         /* # and address of bins needed for projection */
   int ix, sw;            /* Image strip offset + I_load, strip width    */
   int d5, d6, d7;        /* Loop control registers                      */
   int n;                 /* Number of pixels per strip.                 */ histogram *ehp;                        /* -> E histogram              */
   histogram *(*zhist_function)();
   register histogram *ph;                /* projection histogram */
   register int i, *bp;                   /* counter, bin pointer */ struct              /* This histogram is for reading the E array in */
   { histogram h;      /* case the caller doesn't want it so we can do */
     int bins[256];    /* a consistency check                          */
   }
   eh;

/* If no projection was supplied, make one                           */ bn = CPRO_BINS( ip-> width, ip-> height, tan_theta );

if (!(ph = projection)) ph = make_hist (bn);
   else if (ph->bins < bn) cct_error (CPRO_ERR_BINS);

/* Set range and clear the bins                                      */ bins = (int *)(ph + 1);
   for (i = ph->range = bn, bp = bins; i; --i) *bp++ = 0;

/* Return z histogram in z_hist if requested.
    * Otherwise use the internal histogram "eh".
    */ eh.h.bins = 256;
```

```c
eh.h.valid = 0;
ehp = z_hist ? *z_hist : &eh.h;

/* Loop over all of the strips. Pick an even strip width such that the
 * number of enclosed pixels is less than 65K.
 */ sw = ip->width == 1 ? 1 :
  min(min( 0x10000/ip->height, 254 ), ip->width ) & 0xfffe;

n = ip-> height * sw;
loop_control (ip, sw, &d5, &d6, &d7);

/* The z histogram is initialized with write_zhist(), and accumulated
 * using add_zhist(). This is necessary to avoid E array bin overflow.
 */ zhist_function = write_zhist;

grab_vm7s();

if( tan_theta >= 0 )
  {
    bp = bins;

for( i=ip->width, ix=ip->x_offset + I_load; i>0; i -= sw, ix += sw )
      {
        if( i < sw ) /* Last time through */
          {
            sw = i;
            n = ip->height * sw;
            loop_control( ip, sw, &d5, &d6, &d7 );
          } project_strip(ip->rat,ix, bp, tan_theta, sw, ip->height, d5,d6,d7);
        zhist_function( ehp, n );
        zhist_function = add_zhist;

bp += sw;
      }
  }
else /* tan_theta < 0 */
  {
    bp = bins + max( ip->width - sw, 0 );

for( i=ip->width, ix=ip->x_offset + I_load; i>0; i -= sw, ix += sw )
      {
        if( i < sw ) /* Last time through */
          {
            sw = i;
            n = ip->height * sw;
            loop_control( ip, sw, &d5, &d6, &d7 );
          } project_strip(ip->rat,ix, bp, tan_theta, sw, ip->height, d5,d6,d7);
        zhist_function( ehp, n );
        zhist_function = add_zhist;

bp += -min( i - sw, sw );
      }
  } vm7s_inuse = 0;
```

```
/* Clear ehp-> m1_valid that (write,add)_zhist() set because mom1
 * was read from C[0], but when using project_strip() it isn't valid.
 * Finally, check that the E first moment equals the projection
 * 0th moment.
 */ ph->n = ip->width * ip->height;
ph->valid = (1<<bn_valid) | (1<<n_valid);
moments (ph);

ehp->valid &= ~(1 << m1_valid);
moments (ehp);

if (ehp->mom1l != ph->mom0 || ehp->mom1h)
   { if (!projection) free (ph);
     cct_error (CCHK_ERR_CHK);
   } return ph;
 }
endif
```

```
Jan 30 16:55 1992  histogram_def.h Page 1
```

```
/*
 * Copyright (c)
 * $Date: 91/11/21 16:20:51 $
 * Cognex Corporation
 * Needham, Massachusetts
 *
 * $Source: /nfs/lex/products/x000/defs/histogram_def.h,v $
 * $Revision: 1.7 $
 * $Author: scl $
 *
 */
#ifndef _histogram_def_
#define _histogram_def_

/*      ************************************
        *                                  *
        *  A Histogram and Associated Data *
        *                                  *
        ************************************
```

A histogram consists of a header structure and some number of longword data bins, allocated as one contiguous region of memory. The header holds some bookkeeping information and has slots for every quantity that I thought you might want to derive from a histogram. The bins define a one-dimensional function $h(i)$, where $i$ is the bin index and $h(i)$ is the contents of bin $i$. The bins are always numbered starting with 0.

In typical use, make_hist is called to allocate an empty histogram. The vm7/s translation table is set up and a vm7/s routine is called to fill in the bins from an image. Histogram processing routines are then called to fill in the derived quantities as needed. Finally, the histogram is deallocated with a call to free. Other variations are possible, of course. If the number of bins is known at compile time, a histogram can be allocated as an automatic variable on the stack (a struct consisting of a header followed by the bins, for example). The histogram need not be computed by vm7/s or even from an image.

For each quantity in the histogram, including the bins and all derived quantities, there is a bit in the header element "valid" that if set indicates that the corresponding quantity has been computed and should be considered valid. The function make_hist clears all valid bits. The routine that fills in the bins will set bn_valid and n_valid, and possibly some of the moments if known. The rest of the bits are set as the quantities are computed.

The valid bits have three purposes: 1) To prevent inadvertant use of the bins before they are filled in. 2) To save time by allowing routines to compute just the quantities that they need without computing Jan 30 16:55 1992 histogram_def.h Page 2 any quantity more than once. 3) To provide hardware and software
redundency checks. Any routine that as part of its normal operation can
compute a quantity at no significant cost, should do so regardless of
whether that quantity has been asked for or is already valid. If the
quantity is already valid the recomputed value is checked against the
value already in the header, and a throw or chk trap is taken if they
disagree. Redundency checking is very important for vm7/s operation,
where subtle hardware and software problems might exist and a significant
amount of redundent information is available. For example, one serious
software problem that can be detected is failing to observe the convention
that the entire E and C arrays must be left 0 by any routine using vm7/s.

One of the derived quantities in the header is the 101 element array "ic",
which is the inverse of the cumulative function of h(i). The index of ic
is measured in percent, from 0 to 100 inclusive. The quantity ic[j] is a
histogram bin index, such that j percent of the area under the function
h(i) is at or to the left of that bin. More precisely, ic[j] is the
smallest integer such that $$\frac{1}{mom0} \sum_{i=0}^{ic[j]} h(i) >= \frac{j}{100}$$

except for j = 0, where the ">=" is replaced with a ">".
The inverse cumulative has many uses. ic[50] is the median (blue dot)
of h(i). Left and right tails can be looked up directly from parameters
expressed in percent, for example ic[5] and ic[95] for 5% tails. Min and
max image values can also be looked up -- they are ic[0] and ic[100].
All of these quantities are important both for grey scale histograms
and spatial histograms.
*/

```
/* The histogram header.                                              */
typedef struct
   ( short
        bins,             /* number of histogram bins available        */
        range;            /* number of bins in use                     */
     unsigned int
        valid,            /* "Valid" bits for derived quantities.      */
        n,                /* Number of samples used to make the histogram */
        mom0,             /* 0th moment: SUM [h(i)]                    */
        mom1h,            /* 1st moment: SUM [i*h(i)] High order part. */
        mom1l,            /* Low part of 1st moment                    */
        mom2h,            /* 2nd moment: SUM [i*i*h(i)] High order part. */
        mom2l,            /* Low order part of 2nd moment.             */
        mean_sample,      /* (mom0 / n) * 100                          */
```

Jan 30 16:55 1992 histogram_def.h Page 3

```
      mean_x,      /* (mom1 / mom0) * 100                  */
      variance,    /* (mom2 - mom1 * mom1 / n) / n * 100   */
      sd;          /* sqrt (variance) * 100                */
    short
      ic [101];    /* inverse of cumulative.               */
  }
  histogram;

/* Histogram valid bit assignments. This is done as an enumeration
   type so that the values can be made available to assembler code
   with h2m68.
*/
enum valid_bits
  { bn_valid,  n_valid, m0_valid, m1_valid,
    m2_valid, ms_valid, mx_valid, vr_valid,
    sd_valid, ic_valid
  };

/* This structure contains the histogram structure & bins for
 * an intensity histogram.
 */ define Z_BINS 256 typedef struct z_histogram
  { histogram h;          /* The histogram header */
    int bins[ Z_BINS ];   /* The histogram bins   */
  }
z_histogram;

#endif
```

Jan 30 16:53 1992  vp_project_strip.m68 Page 1

```
*       Copyright (c) $Date: 90/08/16 15:59:53 $ Cognex Corporation, Needham, MA 02194
*
*       $Source: /nfs/lex/products/x000/src/cpro/vp_project_strip.m68,v $
*       $Revision: 1.8 $
*       $Author: peter $
*       $Locker: $ ;***********************************************
;                                               *
;   Project Strip of Image onto line at Arbitrary Angle  *
;                                               *
;***********************************************

* For now, the same code runs on VM8 and VM10.  The optimal code on
* VM10 should use the A-register mode.

nolist
        include section.168
        include which_bd.168
        ifne    C_BOARD-C_UNIX
        include argoff.168
        include vcp.168
        include rept.168
        list our_section data DC      '$Source: /nfs/lex/products/x000/src/cpro/vp_project_strip.m68,v $'
        DC      '$Revision: 1.8 $' xdef    _project_strip,_project_table

* void project_strip (rat, ioffset, bins, tan_theta, width, height, d5, d6, d7)
*       char **rat;        /* RAT from image                              */
*       int
*       ioffset,           /* offset of strip, + I_load                   */
*       *bins,             /* starting address for bins of projection     */
*       tan_theta,         /* tan(theta) (31.16)                          */
*       width,             /* width of strip, <= 254                      */
*       height,            /* height of strip                             */
*       d5, d6, d7;        /* initializers for loop control registers     */

* register save list
rsl     reg     d0-d7/a0-a6
        ;*****************
        ;                *
        ; Entry Point    *
        ;                *
```

Jan 30 16:53 1992  vp_project_strip.m68  Page 2

```
        ;****************
* registers:
*       d0
*       d1      model address increment (32.16)
*       d2      row counter
*       d3      model address offset, fractional part (32.16)
*       d4      inner loop counter
*       d5      row entry point offset pair
*       d6      inner loop entry point offset pair
*       d7      inner loop count pair
*       a0      -> model codes during loop
*       a1      -> image pixels during loop
*       a2      -> image RAT
*       a3      -> next C element to read
*       a4      -> next histogram bin to write
*       a5      -> model codes for start of row our_section     fast
_project_strip:
        link    a6,#0
        movem.l rs1,-(sp)

* initialization
        movem.l arg6$1(a6),d2/d5-d7   * load a bunch of registers from args
        subq.w  #1,d2                 * for dbf
        moveq   #0,d3                 * 0 model offset
        move.l  arg1$1(a6),a2         * -> RAT
        move.l  #C_array,a3           * -> C array
        move.l  arg3$1(a6),a4         * -> next bin
        move.l  #model_codes,a5       * a5 -> model codes
        move.l  arg4$1(a6),d1         * tan(theta) -> d1
        bpl.s   .20                   * <0?
        neg.l   d1                    * yes, abs(tan(theta))
        lea     254(a5),a5            * adjust model code pointer
        movs.w  arg5$w(a6),d0         * adjust C array pointer
        lsl.w   #2,d0
        add.w   d0,a3
.20     bra.s   .10 nextrow:
        add.l   d1,d3                 * update model offset
        bclr    #16,d3                * overflow to integer part?
        beq.s   .10
        swap    d5                    * yes, swap odd/even model alignment
        swap    d6
        swap    d7 tst.w   arg4$1(a6)            * tan(theta) >= 0?
        bmi.s   .11
```

Jan 30 16:53 1992 vp_project_strip.m66 Page 3

```
            move.l   (a3)+,d0            * yes, update next projection bin
            add.l    d0,(a4)+
            addq.l   #1,a5               * advance model pointer
            tst.b    (a5)                * handle wrap around
            bne.s    .10
            lea      -254*4(a3),a3       * wrap C pointer
            lea      -254(a5),a5         * wrap M pointer
            bra.s    .10

.11:        move.l   -(a3),d0            * tan(theta) < 0, update projection
            add.l    d0,(a4)+            * bin
            tst.b    -(a5)               * advance model pointer
            bne.s    .12                 * wrap model pointer?
            lea      254(a5),a5          * yes
.12:        cmp.l    #C_array,a3         * wrap C pointer?
            bne.s    .10
            lea      254*4(a3),a3        * yes .10:        mova.w   d7,d4               * init inner loop counter
            move.l   a5,a0               * starting address for model codes
            add.l    #M_load,a0
            move.l   (a2)+,a1            * starting address for next image row
            add.l    arg2$1(a6),a1
            jmp      ee0(pc,d5.w)        * jump to 1 of 16 possible entry
                                         ; points depending on alignment
                                         ; and width % 4 oo3:        cmpm.b   (a0)+,(a1)+
ee2:        cmpm.w   (a0)+,(a1)+
ee0:        jmp      loop0(pc,d6.w)

oo0:        cmpm.b   (a0)+,(a1)+
ee3:        cmpm.w   (a0)+,(a1)+
ee1:        jmp      loop1(pc,d6.w)

oo1:        cmpm.b   (a0)+,(a1)+
            jmp      loop0(pc,d6.w)

oo2:        cmpm.b   (a0)+,(a1)+
            jmp      loop1(pc,d6.w)

oe0:        tst.w    (a0)+
            tst.b    (a1)+
            cmpm.w   (a0)+,(a1)+
            jmp      loop2(pc,d6.w)

oe1:        tst.w    (a0)+
            tst.b    (a1)+
            cmpm.w   (a0)+,(a1)+
            jmp      loop3(pc,d6.w)
```

Jan 30 16:53 1992  vp_project_strip.m68 Page 4

```
oe2:    tst.w   (a0)+
        tst.b   (a1)+
        jmp     loop2(pc,d6.w)

oe3:    tst.w   (a0)+
        tst.b   (a1)+
        jmp     loop3(pc,d6.w)

eo0:    tst.b   (a0)+
        cmpm.w  (a0)+,(a1)+
        jmp     loop3(pc,d6.w)

eo1:    tst.b   (a0)+
        jmp     loop2(pc,d6.w)

eo2:    tst.b   (a0)+
        jmp     loop3(pc,d6.w)

eo3:    tst.b   (a0)+
        cmpm.w  (a0)+,(a1)+
        jmp     loop2(pc,d6.w)

loop0:  our_rept    8,<cmpm.l (a0)+,(a1)+>
        dbf     d4,loop0
        bra.s   rowend loop1:  our_rept    8,<cmpm.l (a0)+,(a1)+>
        dbf     d4,loop1
        cmpm.b  (a0)+,(a1)+
        bra.s   rowend loop2:  our_rept    8,<cmpm.l (a0)+,(a1)+>
        dbf     d4,loop2
        tst.b   (a1)+
        bra.s   rowend loop3:  our_rept    8,<cmpm.l (a0)+,(a1)+>
        dbf     d4,loop3
        cmpm.b  (a0)+,(a1)+
        tst.b   (a1)+ rowend: dbf     d2,nextrow

* done with strip, write out rest of bins
        move.w  arg5Sw(a6),d1       * # of bins to write
        tst.w   arg4S1(a6)
        bmi     .32

* tan(theta) >= 0 case
        addq.l  #1,a5
```

Jan 30 16:53 1992  vp_project_strip.m68 Page 5

```
        bra.s    .41
.40:    move.l   (a3)+,d0
        add.l    d0,(a4)+
        tst.b    (a5)+
        bne.s    .41
        lea      -254*4(a3),a3
.41:    dbf      d1,.40
        bra.s    .50

* tan(theta) < 0 case
.32:    sub.l    #M_load,a0
        bra.s    .31
.30:    move.l   -(a3),d0
        add.l    d0,(a4)+
        tst.b    -(a0)
        bne.s    .31
        lea      254*4(a3),a3
.31:    dbf      d1,.30

.50:    movem.l  (sp)+,rs1
        unlk     a6
        rts

_project_table:
        dc.l     ee0,ee1,ee2,ee3
        dc.l     eo0,eo1,eo2,eo3
        dc.l     oe0,oe1,oe2,oe3
        dc.l     oo0,oo1,oo2,oo3 model_codes:
        dc.b     $00,$01,$02,$03,$04,$05,$06,$07,$08,$09,$0A,$0B,$0C,$0D,$0E,$0F
        dc.b     $10,$11,$12,$13,$14,$15,$16,$17,$18,$19,$1A,$1B,$1C,$1D,$1E,$1F
        dc.b     $20,$21,$22,$23,$24,$25,$26,$27,$28,$29,$2A,$2B,$2C,$2D,$2E,$2F
        dc.b     $30,$31,$32,$33,$34,$35,$36,$37,$38,$39,$3A,$3B,$3C,$3D,$3E,$3F
        dc.b     $40,$41,$42,$43,$44,$45,$46,$47,$48,$49,$4A,$4B,$4C,$4D,$4E,$4F
        dc.b     $50,$51,$52,$53,$54,$55,$56,$57,$58,$59,$5A,$5B,$5C,$5D,$5E,$5F
        dc.b     $60,$61,$62,$63,$64,$65,$66,$67,$68,$69,$6A,$6B,$6C,$6D,$6E,$6F
        dc.b     $70,$71,$72,$73,$74,$75,$76,$77,$78,$79,$7A,$7B,$7C,$7D,$7E,$7F
        dc.b     $80,$81,$82,$83,$84,$85,$86,$87,$88,$89,$8A,$8B,$8C,$8D,$8E,$8F
        dc.b     $90,$91,$92,$93,$94,$95,$96,$97,$98,$99,$9A,$9B,$9C,$9D,$9E,$9F
        dc.b     $A0,$A1,$A2,$A3,$A4,$A5,$A6,$A7,$A8,$A9,$AA,$AB,$AC,$AD,$AE,$AF
        dc.b     $B0,$B1,$B2,$B3,$B4,$B5,$B6,$B7,$B8,$B9,$BA,$BB,$BC,$BD,$BE,$BF
        dc.b     $C0,$C1,$C2,$C3,$C4,$C5,$C6,$C7,$C8,$C9,$CA,$CB,$CC,$CD,$CE,$CF
        dc.b     $D0,$D1,$D2,$D3,$D4,$D5,$D6,$D7,$D8,$D9,$DA,$DB,$DC,$DD,$DE,$DF
        dc.b     $E0,$E1,$E2,$E3,$E4,$E5,$E6,$E7,$E8,$E9,$EA,$EB,$EC,$ED,$EE,$EF
        dc.b     $F0,$F1,$F2,$F3,$F4,$F5,$F6,$F7,$F8,$F9,$FA,$FB,$FC,$FD
        dc.b     $00,$01,$02,$03,$04,$05,$06,$07,$08,$09,$0A,$0B,$0C,$0D,$0E,$0F
        dc.b     $10,$11,$12,$13,$14,$15,$16,$17,$18,$19,$1A,$1B,$1C,$1D,$1E,$1F
        dc.b     $20,$21,$22,$23,$24,$25,$26,$27,$28,$29,$2A,$2B,$2C,$2D,$2E,$2F
        dc.b     $30,$31,$32,$33,$34,$35,$36,$37,$38,$39,$3A,$3B,$3C,$3D,$3E,$3F
```

Jan 30 16:53 1992  vp_project_strip.m68 Page 6

```
    dc.b    $40,$41,$42,$43,$44,$45,$46,$47,$48,$49,$4A,$4B,$4C,$4D,$4E,$4F
    dc.b    $50,$51,$52,$53,$54,$55,$56,$57,$58,$59,$5A,$5B,$5C,$5D,$5E,$5F
    dc.b    $60,$61,$62,$63,$64,$65,$66,$67,$68,$69,$6A,$6B,$6C,$6D,$6E,$6F
    dc.b    $70,$71,$72,$73,$74,$75,$76,$77,$78,$79,$7A,$7B,$7C,$7D,$7E,$7F
    dc.b    $80,$81,$82,$83,$84,$85,$86,$87,$88,$89,$8A,$8B,$8C,$8D,$8E,$8F
    dc.b    $90,$91,$92,$93,$94,$95,$96,$97,$98,$99,$9A,$9B,$9C,$9D,$9E,$9F
    dc.b    $A0,$A1,$A2,$A3,$A4,$A5,$A6,$A7,$A8,$A9,$AA,$AB,$AC,$AD,$AE,$AF
    dc.b    $B0,$B1,$B2,$B3,$B4,$B5,$B6,$B7,$B8,$B9,$BA,$BB,$BC,$BD,$BE,$BF
    dc.b    $C0,$C1,$C2,$C3,$C4,$C5,$C6,$C7,$C8,$C9,$CA,$CB,$CC,$CD,$CE,$CF
    dc.b    $D0,$D1,$D2,$D3,$D4,$D5,$D6,$D7,$D8,$D9,$DA,$DB,$DC,$DD,$DE,$DF
    dc.b    $E0,$E1,$E2,$E3,$E4,$E5,$E6,$E7,$E8,$E9,$EA,$EB,$EC,$ED,$EE,$EF
    dc.b    $F0,$F1,$F2,$F3,$F4,$F5,$F6,$F7,$F8,$F9,$FA,$FB,$FC,$FD endc
```

Jan 30 16:53 1992 vp_image_xhist.m68 Page 1

```
*       Copyright (c) $Date: 91/11/21 16:29:16 $
*       Cognex Corporation, Needham, MA 02194
*       $Source: /nfs/lex/products/x000/src/cpro/vp_image_xhist.m68,v $
*       $Revision: 1.13 $
*       $Locker: $
        plen    52,2,0

;***************
;              *
; X Histogram  *
;              *
;***************

* For now, the same code runs on VM8 and VM10.  The optimal code on
* VM10 should use the A-register mode.

nolist
        include section.i68
        include which_bd.i68
        ifne C_BOARD-C_UNIX
        include callc.i68
        include argoff.i68
        include vcp.i68
        include image_xhist.h68
        list our_section data DC      '$Source: /nfs/lex/products/x000/src/cpro/vp_image_xhist.m68,v $'
        DC      '$Revision: 1.13 $' xdef    _image_xhist
        xref    _E_clear,_write_zhist,_make_hist,_cct_error
        xref    _grab_vm7s,_vm7s_inuse

* histogram *image_xhist (image, x_hist, z_hist)
*   cip_buffer *image;
*   histogram *y_hist, **z_hist;
*
* Compute and return a X (sum of columns) histogram from a FAST8 image.
* If requested, also return a Z histogram of the image. If the x_hist
* argument is 0, a new histogram will be allocated. If z_hist is 0, no
* Z histogram will be returned. If z_hist points to a 0, a new one will
* be allocated and returned to *z_hist. Otherwise use **z_hist.
*
* Stack frame:

offset  0
        ds.l    6+4
regs    equ     -*              * register save area
```

Jan 30 16:53 1992 vp_image_xhist.m68 Page 2

```
        ds.l    1
bins    equ     .*              * ->current position in xhist bins
        ds.l    1
rat     equ     .*              * copy of image->rat
        ds.l    1
counter equ     .*              * precomputed inner loop counters
        ds.w    1
odd     equ     .*              * 1 if image has odd alignment
        ds.b    1+254+8
        ds.w    0
mode1   equ     .*              * model codes (must be highest on stack)

* Register save list rsl     reg     d2-d7/a2-a5 our_section     fast

* Register use during initialization:
*
*       d3      "ODD"
*       d4      image-> height
*       d5      image-> x_offset
*       d6      image->width
*
*       a3      -> image
*       a5      image-> rat
*       a6      normal link pointer for argument references _image_xhist:

link    a6,#model
        movem.l rsl.regs(a6)

move.l  arg1$1(a6),a3
        move.w  cip_buffer$flags(a3),d0
        and.w   #CIP_FLAGS_FAST8,d0
        bne.s   .1
        callc   cct_error,4,#CIP_ERR_PELDEPTH
.1:     move.l  cip_buffer$rat(a3),a5
        move.l  a5,rat(a6)
        moveq   #0,d6
        move.w  cip_buffer$width(a3),d6
        moveq   #0,d4
        move.w  cip_buffer$height(a3),d4
        moveq   #0,d5
        move.w  cip_buffer$x_offset(a3),d5
        move.l  (a5),d3
        add.w   d5,d3
                                * a3 -> image

* a5 -> RAT

* d6 = image-> width

* d4 = image-> height

* d5 = image-> x_offset
```

Jan 30 16:53 1992  vp_image`xhist.m68 Page 3

```
        and.l   #1,d3                   * d3 = 1/0 : odd/even alignment
        move.w  d3,odd(a6)
        add.l   #1_load,d5              * vm7s control bits
        sub.l   d3,d5                   * word-align rat[n]+d5

* Get X histogram, allocate if necessary, check for sufficient bins,
* set histogram range, get pointer to bins.

move.l  arg2$1(a6),d0
        bne.s   .220
        callc   make_hist,4,d5
.220:   move.l  d0,a0
        move.l  d0,arg2$1(a6)
        chk     histogram$bins(a0),d6
        move.w  d6,histogram$range(a0)
        move.w  d4,d0
        mulu    d6,d0                   * Number of pixels.
        move.l  d0,histogram$n(a0)      *
xvalid  equ     1<<bn_valid+1<<n_valid+1<<m0_valid
        move.l  #xvalid,histogram$valid(a0)
        clr.l   histogram$mom0(a0)
        lea     histogram$(a0),a0       * -> bins.
        move.l  a0,bins(a6)
        tst.l   d0                      * 0 width or height model ?
        bne.s   .4
        move.l  d6,d3
        bra     writex

* Compute model codes. Registers:
*
*       d0      model pel
*       d1      bin counter
*       d3      "odd", then slice width
*       d4      image-> height
*       d6      image-> width
*
*       a0      -> model array

* model for even image: codes 0 - 253. 8 don't cares
* model for odd image: 1 dc, codes 0 - 253, 8 dc's
* If the image is < 254 wide, a smaller model is written to the stack.
* A wide image is processed in 254 pel slices. For each slice 256 pels
* are fetched, but two correspond to a don't care. For the last slice of
* the image, up to 7 bytes past the end of row are fetched, since the
* pels are fetched 2 longs at a time. For this reason, write out 8 dc pels
* into the model before doing the last slice.

.4:     lea     model(a6),a0            * a0 -> model array.
        tst.b   d3
        beq     .8
```

Jan 30 16:53 1992 vp_image_xhist.m68 Page 4

```
        move.b   #-1,(a0)+
.5:     move.l   d6,d3
        cmp.w    #254,d3         * does the image fit in 1 slice
        ble      .6
        move.w   #254,d3         * no, the slice is 254 wide
        move.w   d4,d1           * precompute inner loop counter
        subq.w   #1,d1
        lsr.w    #2,d1
        swap     d1                      * dlSh = ( height - 1 )/4
        move.w   #31,d1                  * dlSl = (pels+7)/8 - 1
        move.l   d1,counter(a6)
.6:     move.w   d3,d2
        subq.w   #1,d2
        moveq    #0,d0
.7:     move.b   d0,(a0)+
        addq.b   #1,d0
        dbra     d2,.7
        moveq    #6,d2
        moveq    #-1,d0
.8:     move.b   d0,(a0)+
        dbra     d2,.8

* Register use for input and output loops:
*
*       d0       hi word: 4-rows-at-a-time counter
*                lo word: 8-column blocks counter
*       d1       initial counter values for d0
*       d2       Jump table offset for processing remainder rows.
*       d3       slice width
*       d4       image height
*       d5       slice offset - DDD + I_load
*       d6       image width
*       d7       model pointer + M_load
*       a0       1st row pointer
*       a1       2nd row pointer
*       a2       3rd row pointer
*       a3       4th row pointer
*       a4       indexes thru model
*       a5       image-> rat
*
* Rows will be processed 4 at a time. The remaining rows are done first.
* an index into a jump table to accomplish this is computed in d2.

move.w   d4,d2
        subq.w   #1,d2
        and.w    #3,d2
        lsl.w    #2,d2             * d2 = ( ( height - 1 ) % 4 ) * 4 lea      model(a6),a4      * Init model pointer
        add.l    #M_load,a4        *
```

Jan 30 16:53 1992 vp_image_xhist.m&S Page 5

```
            move.l   a4,d7
            jsr      _grab_vm7s slice:      move.l   counter(a6),d1
            cmp.w    d6,d3              * is this the last slice?
            bne      .10
            lea      model(a6),a0       * yes, pad the end with don't cares
            add.w    odd(a6),a0
            add.w    d3,a0
            moveq    #-1,d1
            moveq    #6,d0
    .9:     move.b   d1,(a0)+
            dbra     d0,.9
            move.w   d4,d1              * and recompute counter
            subq.w   #1,d1
            lsr.w    #2,d1
            swap     d1                 * d1Sh = ( height - 1 )/4
            move.w   d3,d1
            add.w    odd(a6),d1
            subq.w   #1,d1
            asr.w    #3,d1              * d1Sl = (pels+7)/8 - 1
    .10:    move.l   rat(a6),a5
            move.l   (a5)+,a0           * Fetch first row pointer
            add.l    d5,a0              * Add x_offset to row pointer
            move.l   d7,a4              * init model pointer
            move.l   d1,d0              * Init row and block counters.
            move.l   etable(pc,d2.w),a1 * Jump into the computed ESP.
            jmp      (a1)               *

* Entry point table for the remaining rows.

etable: dc.l    .110,.120,.130,.140

* Do one leftover row.

.110:   lsr.w    #1,d0              * The loop is expanded,
            bcc.s    .112               * so reduce the count.

.111:   cmpm.l   (a4)+,(a0)+        * 4 model, 4 pixels
            cmpm.l   (a4)+,(a0)+        * 4 model, 4 pixels.
    .112:   cmpm.l   (a4)+,(a0)+        *
            cmpm.l   (a4)+,(a0)+        *
            dbf      d0,.111            * bra      .144               * done, now do 4 at a time

* Do two leftover rows.

.120:   move.l   (a5)+,a1           * Fetch second row pointer
            add.l    d5,a1              * Add x_offset to row pointer
```

Jan 30 16:53 1992 vp_image_xhist.m68 Page 6

```
        lsr.w    #1,d0              * The loop is expanded, so
        bcc.s    .122               * reduce the count.

.121:   cmpm.l   (a4)+,(a0)+        * 4 model, 4 pixels
        cmpm.l   (a4)+,(a0)+        * 4 model, 4 pixels
        cmpm.l   (a1)+,(a1)+        * 8 pixels from row 2

.122:   cmpm.l   (a4)+,(a0)+        *
        cmpm.l   (a4)+,(a0)+        * Next chunk. Note that the next
        cmpm.l   (a1)+,(a1)+        * model codes are being loaded.
        dbf      d0,.121            * bra.s    .144               * done. now do 4 at a time

* Do three leftover rows.

.130:   move.l   (a5)+,a1           * Fetch third row pointer.
        add.l    d5,a1              * Add x_offset to row pointer move.l   (a5)+,a2           * Same for third row pointer
        add.l    d5,a2              * lsr.w    #1,d0              * The loop is expanded,
        bcc.s    .132               * so reduce the count.

.131:   cmpm.l   (a4)+,(a0)+        * 4 model, 4 pixels
        cmpm.l   (a4)+,(a0)+        * 4 model, 4 pixels
        cmpm.l   (a1)+,(a1)+        * 8 pixels from row 2
        cmpm.l   (a2)+,(a2)+        * 8 pixels from row 3

.132:   cmpm.l   (a4)+,(a0)+        *
        cmpm.l   (a4)+,(a0)+        * Next chunk.
        cmpm.l   (a1)+,(a1)+        *
        cmpm.l   (a2)+,(a2)+        *
        dbf      d0,.131            * bra.s    .144               * done, now do 4 at a time

* Do next four rows

.143:   move.l   d7,a4              * init model pointer
        swap     d0                 * save row count
        move.w   d1,d0              * init block counter move.l   (a5)+,a0           * Make the first row pointer
        add.l    d5,a0              *

* Entry point for no leftover rows
```

Jan 30 16:53 1992 vp_image_xhist.m68 Page 7

```
.140:   move.l  (a5)+,a1            * Make the second row pointer
        add.l   d5,a1               * move.l  (a5)+,a2            * Make the third row pointer
        add.l   d5,a2               * move.l  (a5)+,a3            * Make the fourth row pointer
        add.l   d5,a3               * lsr.w   #1,d0               * Loop is expanded,
        bcc.s   .142                * reduce the loop count.

.141:   cmpm.l  (a4)+,(a0)+         * 4 model, 4 row 1 pixels
        cmpm.l  (a4)+,(a0)+         * 4 model, 4 row 1 pixels
        cmpm.l  (a1)+,(a1)+         * 8 row 2 pixels
        cmpm.l  (a2)+,(a2)+         * 8 row 3 pixels
        cmpm.l  (a3)+,(a3)+         * 8 row 4 pixels .142:   cmpm.l  (a4)+,(a0)+         * Reload the model fifo, do
        cmpm.l  (a4)+,(a0)+         * the next chunk.
        cmpm.l  (a1)+,(a1)+         *
        cmpm.l  (a2)+,(a2)+         *
        cmpm.l  (a3)+,(a3)+         *
        dbf     d0,.141

.144:   swap    d0                  * done, get row counter
        dbf     d0,.143             * 4 more rows?

* Register use during histogram writing.
*
*       d0      loop counter
*       d1      Sum of pixels
*       d3      slice width
*
*       a0      temp
*       a2      -> xhist bins, then ->xhist struct
*       a3      -> vm7/s C[0]
*
writex: move.l  #C_array,a3         * a3-> C array.

* Write the x_hist bins, and compute the sum of all pixels move.w  d3,d0
        moveq   #0,d1
        move.l  bins(a6),a2
        bra.s   .201

.200:   move.l  (a3)+,a0            * Get the sum of a column.
        move.l  a0,(a2)+            * Write it to x_hist.
        add.l   a0,d1               * Keep a total of all pixels.
```

Jan 30 16:53 1992 vp_image_xhist.m58 Page 8

```
.201:   dbf     d0,.200                 *
        move.l  a2,bins(a6)
        move.l  arg2$l(a6),a2
        add.l   d1,histogram$mom0(a2)

* go to next slice sub.l   d3,d6                   * compute width left to go
        add.l   d3,d5                   * add slice just done to offset
        cmp.l   d6,d3                   * more than 1 slice remaining?
        blt     slice
        move.l  d6,d3                   * no - do possibly smaller last slice
        bne     slice                   * unless we're all done

* Write z_hist if requested.

move.l  arg3$l(a6),d0           * Branch if z_hist not requested.
        beq.s   .210 move.l  d0,a0
        callc   write_zhist,44,(a0),histogram$n(a2)
        move.l  d0,a1                   * Since mom1 wasn't in C[0] as expected
        move.l  histogram$mom0(a2),histogram$mom1l(a1)  * by write_hist, store
        clr.l   histogram$mom1h(a1)
        move.l  d0,(a0)                 * correct value and return z_hist
        bra.s   .211                    *

.210:   jsr     _E_clear                * not requested, clear E
.211:   clr.b   _vm7s_inuse
        move.l  arg1$l(a6),d0           * Return x_hist.
        movem.l regs(a6),rsl            *
        unlk    a6                      *
        rts endc
```

I claim:

1. An apparatus for identifying a linear pattern, having an expected radius less than or equal to a value r, in an image signal, I, said apparatus comprising:

A. projection means for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis, B. mirror symmetry filter means, coupled with said projection means, responsive to said radius and said projection signal for filtering that projection signal to generate a mirror symmetry signal, S, representative of the degree of symmetry of the projection signal P about each point therein, wherein said mirror symmetry filter means includes means for filtering said projection signal P to generate two mirror symmetry signals, $S_1$ and $S_2$, wherein each signal $S_1$, $S_2$ is representative of the degree of symmetry of the projection signal P about each point therein, and wherein each signal $S_1$, $S_2$ is out of phase with the other, C. notch detection means, coupled with said mirror symmetry filter means, for operating on said mirror symmetry signal with a selected mask to generate a peak location signal emphasizing a peak in said mirror symmetry signal corresponding to a location of a center of said linear pattern, and D. peak locating means, coupled with said notch detection means, for identifying a peak in said peak location signal, and for estimating from a location of that peak a location of a center of said linear pattern.

2. An apparatus for identifying a cross-hair comprising a plurality of intersecting linear patterns, having expected radii less than or equal to a value r, in an image signal, I, said apparatus comprising:

A. projection means for a generating, for each of said linear patterns, a corresponding projection signal, P, representative of a projection of said image signal along an axis substantially aligned with an expected orientation of that linear pattern, where said projection signal, P, is comprised of elements $P_i$, where i is an integer between 1 and a length of said image signal along the respective axis, B. mirror symmetry filter means, coupled with said projection means, and responsive to said radius and each said projection signal, for filtering that projection signal to generate a corresponding mirror symmetry signal, S, representative of the degree of symmetry of the projection signal P about each point therein, wherein said mirror symmetry filter means includes means for filtering said projection signal P to generate two mirror symmetry signals, $S_1$ and $S_2$, wherein each signal $S_1$, $S_2$ is representative of the degree of symmetry of the projection signal P about each point therein, and wherein each signal $S_1$, $S_2$ is out of phase with the other, C. notch detection means, coupled with said mirror symmetry filter means, for operating on each said mirror symmetry signal with a selected mask to generate a corresponding peak location signal emphasizing a peak in each said mirror symmetry signal corresponding to a location of a center of the corresponding linear pattern, D. peak locating means, coupled with said notch detection means, for identifying a peak in each said peak location signal, and for estimating from a location of that peak a location of a center of the corresponding linear pattern, and E. center point locating means, coupled with said peak locating means, for determining the center of said cross-hair pattern to lie at an intersection of the estimated locations of said linear patterns.

3. An apparatus according to any of claim 1 and 2, wherein said mirror symmetry filter means includes A. means for filtering a projection signal to generate said mirror symmetry signal, $S_1$, comprising elements $S_1 i$, wherein each element $S_1 i$ has a value determined in accord with the mathematical function $$S_{1i} = \sum_{a=1}^{r} |P_{i+a} - P_{i-a}|$$

B. means for filtering a projection signal to generate said mirror symmetry signal, $S_2$, comprising elements $S_2 i$, wherein each element $S_2 i$ has a value determined in accord with the mathematical function $$S_{2i} = \sum_{a=1}^{r-1} |P_{i+a} - P_{i-a}|.$$

4. An apparatus according to claim 3, wherein

A. said notch detection means includes means for operating on each said mirror symmetry signal, $S_1$, $S_2$, to generate corresponding peak location signals, $L_1$, $L_2$.

B. said peak locating means includes i) means for identifying in said peak location signal $L_1$ a position and amplitude of a most significant peak, ii) means for identifying positions and amplitudes of a neighboring point on each side of a most significant peak in said peak location signal $L_2$, and iii) means for estimating from the positions and amplitudes of those neighboring points a location of the center of said linear pattern.

5. An apparatus for identifying a linear pattern, having an expected radius less than or equal to a value r, in an image signal, I, said apparatus comprising:

A. projection means for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis, B. mirror symmetry filter means, coupled with said projection means, responsive to said radius and said projection signal for filtering that projection signal to generate a mirror symmetry signal, S, representative of the degree of symmetry of the projection signal P about each point therein, C. notch detection means, coupled with said mirror symmetry filter means, for operating on said mirror symmetry signal with a selected mask to generate a peak location signal emphasizing a peak in said mirror symmetry signal corresponding to a location of a center of said linear pattern, wherein said notch detection means includes means for operating on said mirror symmetry signal S with a selected mask in accord with the mathematical function $$L_i = \min\left(\frac{1}{p}\sum_{j=0}^{p-1} S_{i+j}, \frac{1}{p}\sum_{j=p+2z+n}^{2p+2z+n-1} S_{i+j}\right) - \frac{1}{n}\sum_{j=p+z}^{p+z+n-1} S_{i+j}$$

where N, P and Z are elements of said mask, each of respective lengths n, p and z, and

- D. peak locating means, coupled with said notch detection means, for identifying a peak in said peak location signal, and for estimating from a location of that peak a location of a center of said linear pattern.

6. An apparatus for identifying a cross-hair comprising a plurality of intersecting linear patterns, having expected radii less than or equal to a value r, in an image signal, I, said apparatus comprising:

- A. projection means for a generating, for each of said linear patterns, a corresponding projection signal, P, representative of a projection of said image signal along an axis substantially aligned with an expected orientation of that linear pattern, where said projection signal, P, is comprised of elements $P_i$, where i is an integer between 1 and a length of said image signal along the respective axis,
- B. mirror symmetry filter means, coupled with said projection means, and responsive to said radius and each said projection signal, for filtering that projection signal to generate a corresponding mirror symmetry signal, S, representative of the degree of symmetry of the projection signal P about each point therein,
- C. notch detection means, coupled with said mirror symmetry filter means, for operating on each said mirror symmetry signal with a selected mask to generate a corresponding peak location signal emphasizing a peak in each said mirror symmetry signal corresponding to a location of a center of the corresponding linear pattern, wherein said notch detection means includes means for operating on said mirror symmetry signal S with a selected mask in accord with the mathematical function $$L_i = \min\left(\frac{1}{p}\sum_{j=0}^{p-1} S_{i+j}, \frac{1}{p}\sum_{j=p+2z+n}^{2p+2z+n-1} S_{i+j}\right) - \frac{1}{n}\sum_{j=p+z}^{p+z+n-1} S_{i+j}$$

where N, P and Z are elements of said mask, each of respective lengths n, p and z, and

- D. peak locating means, coupled with said notch detection means, for identifying a peak in each said peak location signal, and for estimating from a location of that peak a location of a center of the corresponding linear pattern, and
- E. center point locating means, coupled with said peak locating means, for determining the center of said cross-hair pattern to lie at an intersection of the estimated locations of said linear patterns.

7. An apparatus according to any of claims 5 and 6, wherein said notch detection means includes means for generating said peak location signal L by operating on said mirror symmetry signal with a mask signal, M, said mask signal having an amplitude that peaks toward the center.

8. An apparatus according to claim 7, wherein said notch detection means includes means for generating said peak location signal L by operating on said mirror symmetry signal with a mask signal, M, said mask signal having elements $M_k$, where k is between 1 and 7, and where those elements have respective values ½, ½, 0, −1, 0, ½, ½.

9. A method for identifying a linear pattern having an expected radius less than or equal to a value r, in an image signal, I, said method comprising:

- A. a projection step for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis,
- B. a mirror symmetry filter step responsive to said radius and said projection signal for filtering that projection signal to generate a mirror symmetry signal, S, representative of the degree of symmetry of the projection signal P about each point therein, wherein said mirror symmetry filter step includes a step for filtering said projection signal P to generate two mirror symmetry signals, $S_1$ and $S_2$, wherein each signal $S_1$, $S_2$ is representative of the degree of symmetry of the projection signal P about each point therein, and wherein each signal $S_1$, $S_2$ is out of phase with the other,

- C. a notch detection step for operating on said mirror symmetry signal with a selected mask to generate a peak location signal emphasizing a peak in said mirror symmetry signal corresponding to a location of a center of said linear pattern, and
- D. a peak locating step for identifying a peak in said peak location signal, and for estimating from a location of that peak a location of a center of said linear pattern.

10. A method for identifying a cross-hair comprising a plurality of intersecting linear patterns, having expected radii less than or equal to a value r, in an image signal, I, said method comprising:

- A. a projection step for a generating, for each of said linear patterns, a corresponding projection signal, P, representative of a projection of said image signal along an axis substantially aligned with an expected orientation of that linear pattern, where said projection signal, P, is comprised of elements $P_i$, where i is an integer between 1 and a length of said image signal along the respective axis,
- B. a mirror symmetry filter step for responding to said radius and each said projection signal for filtering that projection signal to generate a corresponding mirror symmetry signal, S, representative of the degree of symmetry of the projection signal P about each point therein, wherein said mirror symmetry filter step includes a step for filtering said projection signal P to generate two mirror symmetry signals, $S_1$ and $S_2$, wherein each signal $S_1$, $S_2$ is representative of the degree of symmetry of the projection signal P about each point therein, and wherein each signal $S_1$, $S_2$ is out of phase with the other,

- C. a notch detection step for operating on each said mirror symmetry signal with a selected mask to generate a corresponding peak location signal emphasizing a peak in each said mirror symmetry signal corresponding to a location of a center of the corresponding linear pattern,
- D. a peak locating step for identifying a peak in each said peak location signal, and for estimating from a location of that peak a location of a center of the corresponding linear pattern, and
- E. a center point locating step for determining the center of said cross-hair pattern to lie at an intersection of the estimated locations of said linear patterns.

11. A method according to any of claims 9 and 10, wherein said mirror symmetry filter step includes A. a step for filtering a projection signal to generate said mirror symmetry signal, $S_1$, comprising elements $S_1 i$, wherein each element $S_1 i$ has a value determined in accord with the mathematical function $$Si = \sum_{a=1}^{r} |Pi + a - Pi - a|$$

B. a step for filtering a projection signal to generate said mirror symmetry signal, $S_2$, comprising elements $S_2 i$, wherein each element $S_1 i$ has a value determined in accord with the mathematical function $$Si = \sum_{a=0}^{r-1} |Pi + a - Pi - a - 1|,$$

12. A method according to claim 11, wherein
A. said notch detection step includes a step for operating on each said mirror symmetry signal, $S_1, S_2$, to generate corresponding peak location signals, $L_1, L_2$,
B. said peak locating step includes
  i) a step for identifying in said peak location signal $L_1$ a position and amplitude of a most significant peak,
  ii) means for identifying positions and amplitudes of a neighboring points on each side of a most significant peak in said peak location signal $L_2$, and
  iii) means for estimating, from the positions and amplitudes of those neighboring points a location of the center of said linear pattern.

13. A method for identifying a linear pattern, having an expected radius less than or equal to a value r, in an image signal, I, said method comprising:
A. a projection step for generating a projection signal, P, representative of a projection of said image signal along an axis substantially aligned with an expected orientation of said linear pattern, where said projection signal, P, is comprised of elements $P_i$, wherein i is an integer between 1 and a length of said image signal along said axis,
B. a mirror symmetry filter step responsive to said radius and said projection signal for filtering that projection signal to generate a mirror symmetry signal, S, representative of the degree of symmetry of the projection signal P about each point therein,
C. a notch detection step for operating on said mirror symmetry signal with a selected mask to generate a peak location signal emphasizing a peak in said mirror symmetry signal corresponding to a location of a center of said linear pattern,
wherein said notch detection means includes means for operating on said mirror symmetry signal S with a selected mask in accord with the mathematical function $$L_i = \min\left( \frac{1}{p} \sum_{j=0}^{p-1} S_{i+j}, \frac{1}{p} \sum_{j=p+2z+n}^{2p+2z+n-1} S_{i+j} \right) - \frac{1}{n} \sum_{j=p+z}^{p+z+n-1} S_{i+j}$$

where N, P and Z are elements of said mask, each of respective lengths n, p and z, and D. a peak locating step for identifying a peak in said peak location signal, and for estimating from a location of that peak a location of a center of said linear pattern.

14. A method for identifying a cross-hair comprising a plurality of intersecting linear patterns, having expected radii less than or equal to a value r, in an image signal, I, said method comprising:
A. a projection step for a generating, for each of said linear patterns, a corresponding projection signal, P, representative of a projection of said image signal along an axis substantially aligned with an expected orientation of that linear pattern, where said projection signal, P, is comprised of elements $P_i$, where i is an integer between 1 and a length of said image signal along the respective axis,
B. a mirror symmetry filter step for responding to said radius and each said projection signal for filtering that projection signal to generate a corresponding mirror symmetry signal, S, representative of the degree of symmetry of the projection signal P about each point therein,
C. a notch detection step for operating on each said mirror symmetry signal with a selected mask to generate a corresponding peak location signal emphasizing a peak in each said mirror symmetry signal corresponding to a location of a center of the corresponding linear pattern,
wherein said notch detection means includes means for operating on said mirror symmetry signal S with a selected mask in accord with the mathematical function $$L_i = \min\left( \frac{1}{p} \sum_{j=0}^{p-1} S_{i+j}, \frac{1}{p} \sum_{j=p+2z+n}^{2p+2z+n-1} S_{i+j} \right) - \frac{1}{n} \sum_{j=p+z}^{p+z+n-1} S_{i+j}$$

where N, P and Z are elements of said mask, each of respective lengths n, p and z, and D. a peak locating step for identifying a peak in each said peak location signal, and for estimating from a location of that peak a location of a center of the corresponding linear pattern, and E. a center point locating step for determining the center of said cross-hair pattern to lie at an intersection of the estimated locations of said linear patterns.

15. A method according to any of claims 13 and 14, wherein said notch detection step includes a step for generating said peak location signal L by operating on said mirror symmetry signal with a mask signal, M, said mask signal having an amplitude that peaks toward the center.

16. A method according to claim 15, wherein said notch detection step includes a step for generating said peak location signal L by operating on said mirror symmetry signal with a mask signal, M, said mask signal having elements $M_k$, where k is between 1 and 6, and where those elements have respective values ½, ½, 0, −1, 0, ½, ½.

* * * * *